Nov. 20, 1945.     L. McCULLOCH     2,389,379
ELECTRICAL INSULATION
Filed Dec. 3, 1942
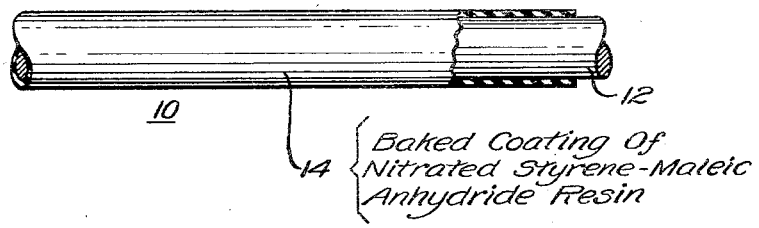
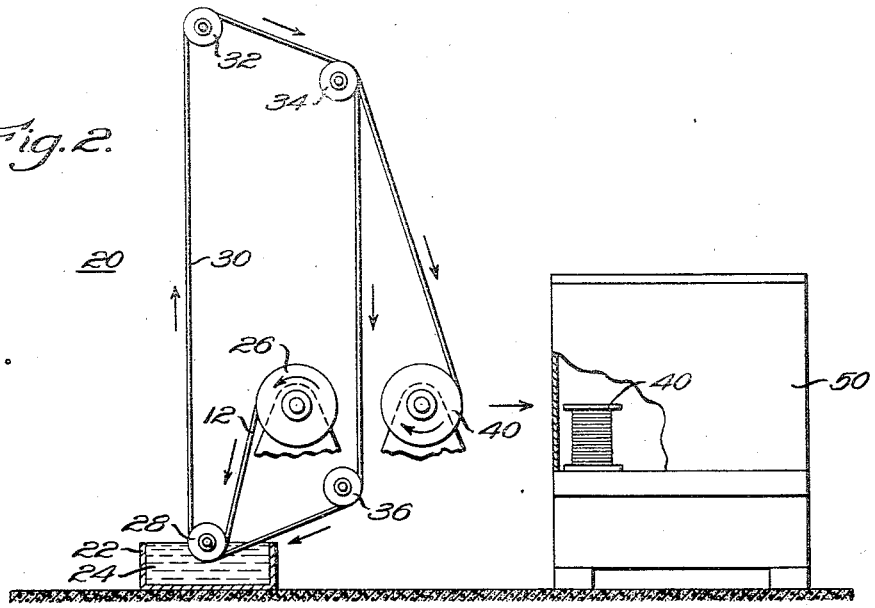
INVENTOR
Leon McCulloch Patented Nov. 20, 1945

2,389,379

UNITED STATES PATENT OFFICE 2,389,379

ELECTRICAL INSULATION

Leon McCulloch, Pittsburgh, Pa., assignor to Westinghouse Electric Corporation, East Pittsburgh, Pa., a corporation of Pennsylvania Application December 3, 1942, Serial No. 467,755

5 Claims. (Cl. 117—65)

This invention relates to insulation for electrical conductors, more particularly for use as wire enamel.

The object of this invention is to provide for insulating electrical conductors with an organic resin.

A further object of this invention is to provide for a hard, tough, moisture resisting electrical insulation by rebaking an organic resin applied to electrical conductors as a wire enamel.

Other objects of the invention will, in part, be obvious and will, in part, appear hereinafter.

For a fuller understanding of the nature and objects of the invention, reference should be had to the drawing, in which:

Figure 1 is a view partly in section and partly in side elevation of an electrical conductor carrying insulation produced in accordance with the teachings of this invention; and Fig. 2 is a schematic view of apparatus for practising the method of producing the insulation of this invention.

According to this invention, an exceptionally hard, tough, moisture and solvent resistant electrical insulation may be applied to conductors. This insulation comprises the heat treated and rebaked residue of a solution containing the reaction product of maleic anhydride and styrene and a high boiling point alcohol employed as a reacting plasticizer.

It has been discovered that a composition, prepared by reacting substantially equal molecular quantities of maleic anhydride and styrene, may be used as a base for a resin having extremely good thermal stability and a remarkable resistance to cracking when subjected to alternate heating and cooling cycles. While most known insulating varnishes will relatively rapidly crack or chip when repeatedly heated to temperatures of 100° C. and cooled to room temperature, the reaction product of maleic anhydride and styrene when applied as a varnish may be alternately heated and cooled for a remarkably great number of cycles without suffering any cracking or other failure. Such tests have been run for months without a single failure being observed. Furthermore, this resin has been applied to conductors and metallic plates in the form of a varnish film and when kept at a temperature of 150° C. for one year has neither cracked nor appreciably darkened in color or exhibited any other characteristic which indicates chemical breakdown.

A substantially equimolar resinous reaction product is prepared most conveniently in the following manner. One part by weight of maleic anhydride is admixed with one part of styrene in two parts of acetone with about 0.1% of benzoyl peroxide or equivalent material as a catalyst in an autoclave. The reaction temperature in the autoclave is kept at about 150° C. After 15 hours, the resulting product of the reaction will be a viscous solution resembling a thick syrup due to the solvent action of the acetone. In order to separate the resin from the solvent acetone, the autoclave product is diluted with a large amount of acetone and poured into a solution of ethyl alcohol in water. Upon stirring, a flocculent precipitate is formed. This precipitate comes down in a curdy mass and may be filtered from the liquid. After washing, the curdy precipitate may be drained and dried by customary methods. The resin may be precipitated from the acetone solution thereof by adding water and kneading the precipitate into a shredded mass. Other processes of preparing the resin may be used in lieu of the process as detailed herein.

The preferred form of the resin consists of a reaction product which corresponds to substantially equal molecular parts of styrene and maleic anhydride. A resin which is satisfactory for the purposes of the invention may be prepared by varying the quantities of the reactants from this proportion up to four parts by weight of styrene per part of maleic anhydride.

The copolymer of maleic anhydride with substantially equal molecular quantities of styrene as produced by the process described has a viscosity of 10,000 centipoises when dissolved in acetone to form a 40% solution by weight. The degree of polymerization may be readily modified by varying the proportions of the reactants, the temperature of reaction and the amount of catalyst to produce, for example, a resin whose viscosity is 75,600 centipoises under the same test conditions. For some uses, the more highly polymerized resins may be more advantageous. The degree of polymerization may be varied to suit requirements.

The resin prepared by reacting maleic anhydride and styrene is preferably dried at 150° C. in order to remove all traces of moisture. The dried resin may be prepared into a liquid coating composition by dissolving in solvents for the resin with the addition of reacting plasticizers to produce the most desirable form of coating composition. Polyhydric alcohols are suitable reacting plasticizers since the copolymer esterifies the polyhydric alcohol and produces a product which is more stable than would result with a non-reacting plasticizer.

In preparing wire enamel by employing the reaction product of maleic anhydride and styrene, the following formulation has proved quite satisfactory:

| | Parts |
|---|---|
| Maleic anhydride styrene resin | 200 |
| Octyl alcohol | 200 |
| Amyl alcohol | 200 |
| Coal tar naptha | 600 |

The resin readily dissolves in the alcohol and naptha mixtures upon heating and stirring. Thereafter, the following mixture of solvent and plasticizer is added.

| | Parts |
|---|---|
| Tetraethylene glycol | 120 |
| Coal tar naptha | 400 |

Finally, the following solution, prepared by vigorously stirring the components and cooling the product, is added slowly in the above solution of resin solvents and plasticizer:

| | Parts |
|---|---|
| Nitric acid conc | 5 |
| Amyl alcohol | 50 |

The nitric acid is believed to partially nitrate the resin during subsequent baking of the resin. Nitration produces unexpected improvements in hardness, toughness and other characteristics of the wire enamel. The composition is ready for use for enameling of electrical conductors.

Referring to Fig. 1 of the drawing, there is shown an insulated conductor 10 prepared by applying to an electrical conductor member 12 the wire enamel solution prepared as indicated above. Upon evaporating the coal tar naptha and the alcohols in part and properly heat treating or baking the residue, an exceedingly hard and tough insulating coating 14 is deposited on the conductor 12.

In order to secure the best results from the maleic anhydride-styrene resin, it is necessary to rebake wire enamel produced therefrom for a prolonged period of time at moderate temperatures. Referring to Fig. 2 of the drawing, there is illustrated one method of producing the best insulating material from the wire enamel. The standard wire enameling machine or tower 20 consists essentially of a pan or trough 22 through which the conductor being insulated passes. In the trough 22 is placed sufficient of the wire enamel prepared as indicated above to provide for covering the metallic conductor 12 being insulated. A supply reel 26 of bare electrical conductor, for example, copper wire which may be solid or stranded or braided as desired, feeds the conductor 12 to a sheave 28 dipping into the enamel 24. The conductor 30 with a coating of the enamel solution is guided upward through a heated tower (not shown) maintained at such temperature that the solvent in the enamel is substantially completely removed. The conductor 30 is guided over sheaves 32, 34 and 36 for subsequent coatings of wire enamel 24 depending on the required thickness desired and the conditions under which coating is accomplished. Customarily four coatings produce an excellent wire enamel insulation. Thereafter, the conductor 30 is wound on reel 40.

The temperatures in the enameling towers are of the order of 400° C., but the time to which the conductor and the applied insulating enamel are subjected to these temperatures is exceedingly short, being a matter of a fraction of a minute.

The maleic anhydride-styrene resin base enamels are not very hard or tough at this stage of the process. The insulated wire on reel 40, for example, may have a scrap value of only 15 to 20 ounces on #20 wire, whereas it is desirable to have an enamel film hard enough to require a pressure of about 30 ounces or more to cause the film to scrape off. The scrap value is determined by pulling enameled wire under a fine round wire (0.009–0.010 inch diameter) of a hard metal applied crosswise to the direction of the enameled wire.

It has been discovered that rebaking or curing the enameled wire on reels or spools 40 for a prolonged period of time will greatly improve the properties of the insulating enamel. For example, the reels 40 may be put into oven 50 and heated at a temperature of from 85° C. to 150° C. or even higher for periods of from one to four days to produce enamel insulation that has a scrap value of 35 ounces or better.

In the rebaking or curing of the wire enamel, it has been discovered that nitrating of the resin is necessary in order to prevent softening of the wire enamel during the rebaking or curing process. The turns of wire on the spools or reels when subjected to temperature of 100° C. or higher, have been found to adhere to one another and the applied enamel coating deformed due to the softening of the resin. However, the addition of nitric acid or an equivalent nitrating material into the wire enamel results in a non-softening wire enamel which is much harder and tougher when it passes from the heat treating towers and apparatus 20 to the reel 40. Reels 40 containing the wire coated with nitrated resin may be safely heated at temperatures of the order of 125° C. without any sticking of the wires to one another, or the enamel deforming. Such rebaked enameled wire may be unwound from the reel 40 smoothly and without any indications of softening having taken place during the baking process in oven 50. Accordingly, it is an important feature of this invention to nitrate the resin employed in the wire enamel.

In the above formulation of a wire enamel from the maleic anhydride-styrene resin, heavy coal tar naphtha is employed as a major portion of the resin solvent. Other solvents may be employed for the resin such, for example, as morpholine and water, or Cellosolve or other convenient suitable organic solvent. Toluene and xylene may be added to replace a part of organic solvents.

Both the tetraethylene glycol and the octyl alcohol are believed to function as reacting plasticizers. It is believed that the reaction of the maleic-anhydride-styrene resin with the octyl alcohol and the tetraethylene glycol takes place during the prolonged rebaking or curing in the oven 50. Other high boiling point alcohols or polyhydric alcohols such as nonaethylene glycol and other polyethylene glycols may be used to provide for a reacting plasticizer.

Nitric acid as such may be added in amounts ranging from 1% to 5% of the weight of the maleic anhydride-styrene resin to provide for nitration thereof. The nitric acid may be added in a water-alcohol solution when morpholine is employed as the solvent for the resin. Nitrates, for example, ammonium nitrate or ethyl nitrate, may be substituted for the nitric acid in preparing the nitrated wire enamel composition disclosed herein suitable for rebaking.

In producing a predetermined viscosity in the wire enamel and to provide for predetermined characteristics in the wire enamel, various other additions may be made. For example, butyl carbitol may be added to provide for a smoother coating upon the electrical conductor.

In some cases, titanium dioxide, chromic oxide and other insulating inorganic materials may be added to increase the heat stability and film thickness produced.

The insulating coatings or enamels produced by employing the maleic anhydride-styrene resins are characterized by exceptional heat stability. When immersed in oil or other liquid dielectrics for a prolonged period of time while the wire is maintained at a high temperature, the enamel did not soften or otherwise deteriorate. The wire enamel is exceedingly flexible without being soft or plastic. Wire coated with the enamel may be stretched up to 30% and wrapped around itself without cracking.

Liquid dielectrics and solvents of all types are resisted very effectively by the rebaked or fully cured wire enamel. The insulating enamels of this invention are superior in solvent resistance to practically all organic enamels in commercial use at the present time. The resistance to solvents is maintained even at elevated temperatures. The resistance to chlorinated hydrocarbon solvents is outstanding. This enamel is much superior to both ordinary tung oil base enamels and numerous synthetic resin enamels in this respect. This constitutes an important feature and renders the use of insulated conductors produced by the use of the enamel insulation of this invention satisfactory when subjected to highly adverse conditions. For example, motors and coils carrying the maleic anhydride-styrene insulation may be employed under conditions of high humidity or moisture or solvent action which would rapidly render ordinary wire enamels ineffective for the purpose.

The specific examples given above are exemplary and are not intended to be limiting but are indicative of the nature of the invention.

I claim as my invention:

1. An insulated electrical conductor comprising, an electrical conductor and insulation thereon comprising a resinous material composed of the partially nitrated reaction product of 100 parts of substantially equivalent proportions of maleic anhydride and styrene, and 1 to 5 parts of nitric acid.

2. A wire enamel comprising a solution in a volatile solvent of 100 parts of the resin derived from reacting substantially equivalent proportions of maleic anhydride and styrene, the solution containing 1 to 5 parts of nitric acid to provide for rebaking the wire enamel without softening.

3. A wire enamel comprising a solution in a volatile solvent of 100 parts of the resin derived from reacting substantially equivalent proportions of maleic anhydride and styrene, the solution containing a high boiling point alcohol and 1 to 5 parts of nitric acid to provide for rebaking the wire enamel without softening.

4. The method of insulating electrical conductors with the resin derived from reacting substantially equivalent proportions of maleic anhydride and styrene which comprises dissolving the resin in a solvent, adding a high boiling point alcohol and thereafter adding nitric acid in the proportion of 1% to 5% of the weight of the resin whereby an enamel of predetermined characteristics is obtained, applying the enamel to an electrical conductor, heat treating the applied enamel to remove the solvent whereby an insulating enamel coating is produced, and further heat treating the applied insulating enamel at a temperature of from 85° C. to 150° C., for a prolonged period of time to increase the hardness, toughness and moisture resistance of the enamel.

5. The method of insulating electrical conductors with the resin derived from reacting substantially equivalent proportions of maleic anhydride and styrene which comprises dissolving the resin in a solvent, adding a high boiling point alcohol and thereafter adding nitric acid in the proportion of 1% to 5% of the weight of the resin whereby an enamel of predetermined characteristics is obtained, applying the enamel to an electrical conductor, heat treating the applied enamel to remove the solvent whereby an insulating enamel coating is produced, winding the electrical conductor with applied insulating enamel upon a reel, and further heat treating the applied insulating enamel at a temperature of from 85° C. to 150° C., for a prolonged period of time to increase the hardness, toughness and moisture resistance of the enamel.

LEON McCULLOCH.